United States Patent [19]

Trapp

[11] Patent Number: 5,375,457

[45] Date of Patent: Dec. 27, 1994

[54] APPARATUS AND METHOD FOR DETECTING LEAKS IN PIPING

[75] Inventor: Donald J. Trapp, Aiken, S.C.

[73] Assignee: The United States of America as represented by the United States Department of Energy, Washington, D.C.

[21] Appl. No.: 70,807

[22] Filed: Jun. 3, 1993

[51] Int. Cl.$^5$ .......................... G01M 3/20; G01M 3/28
[52] U.S. Cl. .................... 73/40.7; 73/40.5 R; 73/40; 73/865.8
[58] Field of Search .............. 73/40.7, 40.5 R, 865.8, 73/40, 49.5, 40.5

[56] References Cited

U.S. PATENT DOCUMENTS

| | | | |
|---|---|---|---|
| 1,822,925 | 9/1931 | Granger | 73/40.5 R |
| 2,486,199 | 10/1949 | Nier | 73/40 |
| 2,504,530 | 4/1950 | Jacobs | 73/40 |
| 2,540,049 | 1/1951 | Hinson | 73/40.7 |
| 2,608,855 | 9/1952 | Jacobs | 73/40 |
| 2,703,978 | 3/1955 | Baxter | 73/40 |
| 3,487,677 | 1/1970 | Molitor | 73/40.7 |
| 3,765,225 | 10/1973 | Rivers | 73/40.7 |
| 3,842,659 | 10/1974 | Bacroix | 73/40.7 |
| 4,189,938 | 2/1980 | Heim | 73/40.7 |
| 4,450,711 | 5/1984 | Claude | 73/40.5 R |
| 4,723,441 | 2/1988 | Sweeney | 73/40.5 R |
| 4,998,435 | 3/1991 | Miller et al. | 73/40.7 |
| 5,063,772 | 11/1991 | Wellington et al. | 73/40.7 |
| 5,081,864 | 1/1992 | Zaim | 73/40 |

Primary Examiner—Hezron E. Williams
Assistant Examiner—J. David Wiggins
Attorney, Agent, or Firm—Brian R. Tumm; Harold M. Dixon; William R. Moser

[57] ABSTRACT

A method and device for detecting the location of leaks along a wall or piping system, preferably in double-walled piping. The apparatus comprises a sniffer probe, a rigid cord such as a length of tube attached to the probe on one end and extending out of the piping with the other end, a source of pressurized air and a source of helium. The method comprises guiding the sniffer probe into the inner pipe to its distal end, purging the inner pipe with pressurized air, filling the annulus defined between the inner and outer pipe with helium, and then detecting the presence of helium within the inner pipe with the probe as is pulled back through the inner pipe. The length of the tube at the point where a leak is detected determines the location of the leak in the pipe.

20 Claims, 1 Drawing Sheet

APPARATUS AND METHOD FOR DETECTING LEAKS IN PIPING

The United States Government has rights in this invention pursuant to Contract No. DE-AC09-89SR18035 between the U.S. Department of Energy and the Westinghouse Savannah River Company.

BACKGROUND OF THE INVENTION

1. Field of the Invention

The present invention relates to detecting leaks in piping systems. More particularly, the present invention relates to methods and devices for detecting leaks and their locations in piping systems.

2. Discussion of Background

Many methods and devices exist for determining the integrity of piping or vessels. Such devices are disclosed generally in several U.S. Patents including U.S. Pat. No. 4,450,711, issued to Claude; U.S. Pat. No. 4,723,441, issued to Sweeney; U.S. Pat. No. 4,998,435, issued to Miller et al; and U.S. Pat. No. 5,063,772, issued to Wellington et al.

In most known leak detecting devices for vacuum-tight vessels, an envelope or hood is used to surround the vessel exterior, a gas source introduces gas into the hood and a mass spectrometer inside the vessel detects the presence of gas that has passed through leaks in the vessel wall. Such devices are disclosed in U.S. Pat. No. 2,504,530, issued to Jacobs, and U.S. Pat. No. 2,486,199, issued to Nier.

Devices and methods similar to these have been applied to piping systems, as disclosed in U.S. Pat. No. 2,703,978, issued to Baxter. U.S. Pat. No. 2,703,978 features a gas-filled hood that the piping moves through. A gas detector inside of the piping operates a recording or marking device that assists in determining whether there are leaks present in the piping. Similarly, in a method for testing the tightness of bodies, Bacroix, in U.S. Pat. No. 3,842,659, discloses a movable gas-filled assembly that passes over the body in combination with a gas detector inside of the body.

Also, in U.S. Pat. No. 3,487,677, Molitor discloses a method for detecting leaks in a vessel or pipe similar to the methods disclosed in U.S. Pat. Nos. 2,504,530 and 2,486,199. Molitor also discloses a container that introduces test gas around a vessel or pipe and a detector, such as a mass spectrometer, connected to the interior of the pipe that detects the presence of any test gas, which indicates a leak in the piping.

Despite the number of available methods and devices for detecting whether there are leaks in piping and other vessels, it is believed that nothing in the prior art sufficiently determines the location of those detected leaks.

There is a need for effectively detecting the presence of leaks in piping and their location within the piping system.

SUMMARY OF THE INVENTION

According to its major aspects and broadly stated, the present invention is a method and device for detecting the location of leaks along a wall or within a piping system. In particular, it is a method and device for detecting the location of leaks in double-walled piping. The apparatus comprises a sniffer probe, a rigid cord such as a length of tube attached to the probe on one end and extending out of the piping with the other end, and independent sources of pressurized air and helium. The method comprises purging the inner pipe with a pressurized gas such as air, filling the annulus defined between the inner and outer pipe with helium, and then detecting the presence of helium within the inner pipe with the probe as it is guided down through the inner pipe by the cord. The detection of helium is represented as a step increase in a detector readout. Preferably, the air is directed by blowing from the proximal end of the pipe to its distal end. The length of the cord at the point where a leak is detected or the distance from the probe and either the proximal end or the distal end of the inner pipe determines the location of the inner pipe leak.

A major feature of the present invention is the use of a constant flow of pressurized air or other gas to initially purge the inner piping and subsequently direct the helium test gas passing through leaks in the piping away from the detecting probe until the probe reaches the leak site.

The use of helium on the outside and air on the inside of the inner pipe is another important feature of the present invention. Helium is a very active gas, more active than the principal constituents of air and many other gases. Therefore, notwithstanding the pressure of the air in the inner pipe, helium will penetrate cracks and flaws in the welds to be detected inside the pipe. Helium also has the advantage of being inert; air has the advantage of being readily available but other gases such as pure nitrogen can be used. Moreover, helium detectors are common items on today's market.

Another feature of the present invention is the use of a cord connected to the probe for directing the movement of the probe within the piping interior. This feature allows the location of leaks to be determined quickly and accurately without disrupting the piping system by ascertaining the amount of the cord outside of the piping during movement and detection by the probe. The cord has a series of markings along its length that determines the distance between the probe and the proximal end of the piping, thus identifying the position of the probe within the piping.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 1:
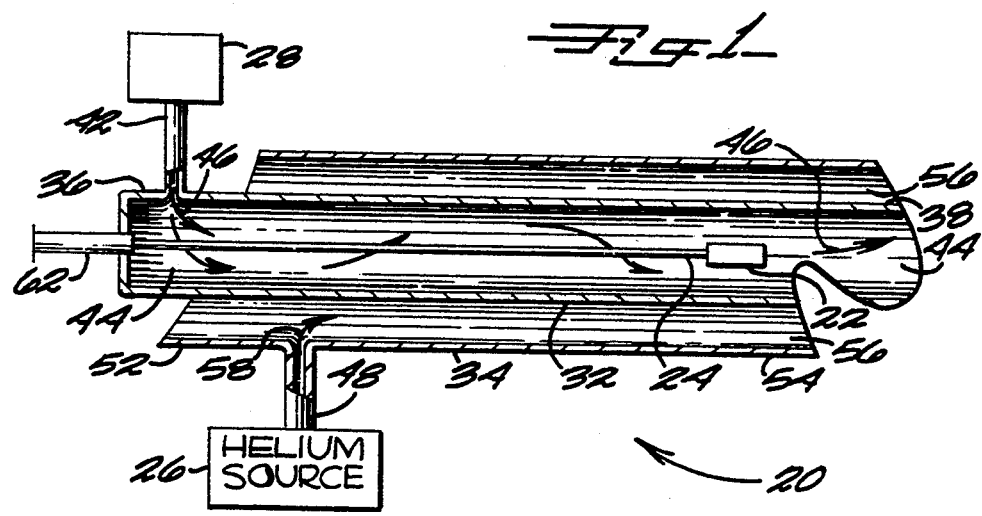
FIG. 1 is a partial, side cross-sectional view of a device for detecting leaks in piping according to a preferred embodiment of the present invention.

In the following description similar components are referred to by the same reference numeral in order to simplify the understanding of the sequential aspect of the drawings. Also, throughout this detailed description, the term "leak" refers to a crack in a wall, a flaw in a welded joint and any other breach in the physical integrity of the wall whether intended by design or arising from use or wear.

Referring now to FIG. 1, the detecting device 20 in its preferred embodiment is a probe 22, a cord 24 connected to probe 22 for directing the movement of probe 22, a source of helium 26 or other relatively active test gas, and a source of pressurized air 28 or other relatively inactive purging gas.

Device 20 is for use in detecting leaks in a wall, such as the wall of underground piping segments or systems. Preferably, device 20 is used for detecting leaks in double-walled piping, that is, piping having an inner pipe 32 that is surrounded by an outer pipe 34.

In this preferred environment, source 28 has a first connecting tube 42 for connecting source 28 to inner pipe 32 at a first proximal end 36. The gas from source 28 is preferably pressurized air but, alternatively, can be any suitable gas that is less active than the test gas from source 26. The "activity" of a gas is related to its molecular weight. Gases with lower molecular weights are more active than those with higher molecular weights.

In the preferred embodiment, pressurized air is directed from source 28, through first connecting tube 42, into an interior area 44 of inner pipe 32. The pressurized air (shown generally by arrows 46) is directed so that it moves from proximal end 36 of inner pipe 32 toward a first distal end 38 of inner pipe 32.

Similarly, a second connecting tube 48 is used with source 26 for connecting source 26 to outer pipe 34 near a second proximal end 52. Although helium is the preferred test gas dispensed from source 26, any suitable test gas can be used provided that it is more active than the purging gas in source 28.

Preferably, source 26 directs helium through second connecting tube 48 and into an annular spacing 56, which is defined between the walls of inner pipe 32 and the surrounding outer pipe 34. Source 26 does not direct helium into annular spacing 56 in any particular direction, although the direction of helium (as shown by arrow 58) can be said to be generally from a second proximal end 52 of outer pipe 34 to a second distal end 54 of outer pipe 34. Helium, being very active, will quickly spread throughout annular spacing 56.

Cord 24 is used to maneuver probe 22 along either of two opposite directions through interior 44 of inner pipe 32, and is preferably a rigid tube or other hollow body having length calibrations marked along its length. Cord 24 can comprise a pipe of small diameter, a solid rod of plastic or other reasonably rigid but resilient material or a rope if used in vertically configured piping, such as a well. It is important that cord 24 have sufficient stiffness to be able to move probe 22 into position and withdraw probe 22 during testing while negotiating any bends in the piping system. Cord 24 connects to probe 22 and preferably has a sufficient length to insert probe 22 from first proximal end 36 to first distal end 38 of inner pipe 32 while simultaneously extending out of first proximal end 36 of inner pipe 32. An entry tube 62 is used at first proximal end 36 to provide access for cord 24 into interior 44 of inner pipe 32.

External to entry tube 62, cord 24 is connected to and controlled by an operating unit (not shown) that axially extends and retracts cord 24 into and out of interior 44 of inner pipe 32. The operating unit is equipped with a small, commercially available pumping unit that draws a gas sample from 22 up to 100 feet within inner pipe 32 to the leak detector (not shown). The calibrations marked along the length of cord 24 determine how much of cord 24 is being inserted into interior 44 of inner pipe 32 at any given time.

Cord 24 controls and directs the movement of probe 22 within interior 44 of inner pipe 32, preferably moving probe 22 axially along interior 44 of inner pipe 32. Since probe 22 is connected to one end of cord 24 and the calibrations along cord 24 determine how much of cord 24 is inserted within interior 44 of inner pipe 32, the position of probe 22 within inner pipe 32 can be determined readily by the operating unit.

For example, probe 22 is inserted into interior 44 of inner pipe 32 at proximal end 36 and it pushed down the interior 44 of pipe 32 in either of the two possible opposite directions by cord 24 until a leak indication is encountered, that is, when the presence of helium is detected. When a leak indication is encountered, the position of probe 22 within interior 44 of inner pipe 32 can be determined by any number of known methods, and thus the location of the leak is determined.

The operating unit has a helium detection unit (not shown) operably connected to probe 22. Thus, when probe 22 detects the presence of helium within interior 44 of inner pipe 32, the helium detection unit responds immediately by showing the detection in the appropriate form, preferably by showing a step increase on a printed readout.

Figure 2:
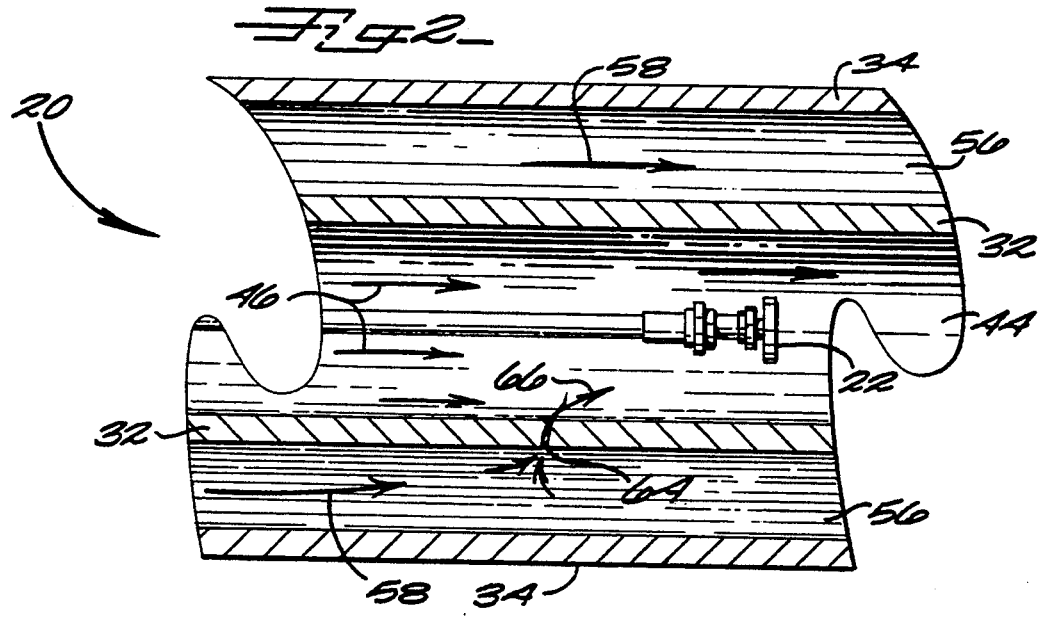
FIG. 2 is a detailed, side cross-sectional view of the device of FIG. 1 showing the flow of gas near a leak in the piping.

In FIG. 2, probe 22 is shown in more detailed view in operation near a leak (shown as 64) in the wall of inner pipe 32. Since helium (arrow 58) confined to annular spacing 56 is more active than pressurized air (arrows 46) passing through interior 44 of inner pipe 32, a portion of the helium (shown generally as arrow 66) passes through leak 64 into interior 44 of inner pipe 32.

Accordingly, when probe 22 moves near leak 64, probe 22 detects the presence of helium (arrow 66), upon which time the operating unit (not shown) receives and acknowledges such information. An operator can then determine from the calibrations marked on cord 24 the distance between first proximal end 36 and the location of probe 22. This distance, when measured along inner pipe 32, provides a relatively accurate location of leak 64.

In use, source 28 directs pressurized air (arrows 46) into interior 44 of pipe 32 and in a direction from first proximal end 36 to first distal end 38. The pressurized air acts to purge interior 44 of inner pipe 32 prior to any leak detection by probe 22. Then, cord 24, having probe 22 connected on its distal end, is inserted into interior 44 of inner pipe 32 and moved distally so that probe 22 moves toward first distal end 38 of inner pipe 32. The speed at which probe 22 is moved can vary, but is dictated primarily by the response time of the leak detector.

When probe 22 comes into contact with a pocket of helium along interior 44 of inner pipe 32, the helium detection unit (not shown) responds preferably with a step increase, as discussed previously. As previously described, the operating unit (not shown), in determining the position of probe 22 within interior 44 of inner pipe 32, provides the location of leak 64 along inner pipe 32.

Once the location of probe 22 has been determined, cord 24 can move probe 22 back and forth past the location of leak 64 to verify the leak indication. The steady flow of pressurized air (arrows 46) from source 28 into interior 44 prevents the helium (arrow 66) from traveling from leak 64 toward first proximal end 36. Also, the movement of pressurized air (arrows 46) keeps helium pockets that have just been detected moving "downstream" from probe 22, thus preventing "redetection" of any helium pockets.

Alternatively, source 28 can direct a periodic flow of pressurized air through interior 44 of inner pipe 32 from first proximal end 36 to first distal end 38. However, a constant flow of pressurized air through interior 44 of inner pipe 32 is better suited for leak inspections of inner pipe 32 in which probe 22 is moving through interior 44 of inner pipe 32 at relatively high speeds or when inner pipe 32 is believed to be free of leaks, perhaps as a result of a recent past inspection.

It is understood that the flow rate and release frequency of pressurized air from source 28 tan be modified depending on the specific needs of the leak detection process as dictated by the size of the piping system to be inspected and the number and size of the leaks detected. The flow rate need not be very great and can be comparable to the speed at which probe 22 is moved, assuming probe 22 is moved slowly.

In this manner just described, it can be determined by nondestructive means whether inner pipe 32 has any leaks and where those leaks are located. Thus, excavation of inner pipe 32 and outer pipe 34 is unnecessary, saving much time and expense.

It will be apparent to those skilled in the art that many changes and substitutions can be made to the preferred embodiment herein described without departing from the spirit and scope of the present invention as defined by the appended claims.

What is claimed is:

1. A method for detecting a leak through a wall, said wall having a first side and a second side, said method comprising the steps of:
    directing a first gas along said purging side of said wall;
    applying a second gas to said second side of said wall, said second gas being more active than said first gas so that a portion of said second gas passes from said second side to said purging side through said leak in said wall;
    moving a probe in a first direction along said first side of said wall, said probe responsive to said second gas;
    detecting said portion of said second gas along said first side of said wall with said probe as said probe is moving in said first direction; and
    determining the location of said leak through said wall when said probe detects said portion of said second gas from the position of said probe with respect to said wall when said portion of said second gas is detected.

2. The method as recited in claim 1, wherein said purging gas is directed along said first side of said wall in a second direction, said second direction being different than said first direction so that, as said probe moves in said first direction, said portion of said second gas is not moving with said probe.

3. The method as recited in claim 1, wherein said determining step further comprises the steps of:
    fixing a reference location on said wall; and
    measuring the distance said probe has moved along said wall in said first direction from said location.

4. The method as recited in claim 1, wherein said wall has a distal end and a proximal end, wherein said first direction runs from said proximal end to said distal end, and wherein said determining step further comprises the steps of measuring the distance said probe has moved along said wall from said proximal end to said position.

5. The method as recited in claim 1, wherein said wall has a distal end and a proximal end, wherein said first direction runs from said proximal end to said distal end, and wherein said purging gas is applied by blowing said purging gas from said proximal end to said distal end so that said second gas, passing from said second side to said first side through leaks in said wall, is carried by said purging gas toward said distal end.

6. A method for detecting a leak in the wall of a pipe, said pipe having a proximal end, a distal end, an interior and an exterior, said method comprising the steps of:
    positioning a probe in said interior of said pipe at said proximal end;
    directing a purging gas along said interior of said pipe;
    applying a second gas to said exterior of said pipe, said second gas being more active than said purging gas so that a portion of said second gas passes from said exterior to said interior through said leak in said wall of said pipe;
    moving said probe along said interior of said pipe from said proximal end to said distal end;
    measuring the position of said probe as it moves along said wall of said pipe;
    detecting said portion of said second gas with said probe as said probe passes along said interior from said proximal end to said distal end; and
    determining the location of said leak in said wall from said position of said probe when said portion of said second gas is detected.

7. The method as recited in claim 6, wherein said purging gas is directed from said proximal end to said distal end so that said portion of said second gas is carried by said purging gas toward said distal end.

8. The method as recited in claim 6, wherein said moving step further comprises the step of pushing said probe from said proximal end to said distal end by a cord having a first end, an opposing second end and a length, said second end attached to said probe, and said measuring step further comprises the steps of:
    measuring a first length of said cord that is external to said pipe when said probe is at said proximal end;
    measuring a second length of said cord external to said pipe when said probe detects said portion of said second gas; and
    subtracting said second length from said first length to yield a third length of said cord approximately equal to the distance said probe has traveled from said proximal end, and said determining step further comprises the step of equating said third length of said cord to the distance said position of said leak is from said proximal end of said pipe.

9. The method as recited in claim 6, wherein said second gas is applied by the step of confining said second gas about said exterior wall of said pipe.

10. The method as recited in claim 6, wherein said second applying step further comprises:
    positioning a hood around said exterior of said pipe, said hood having an inner wall surrounding said exterior and defining an annular spacing therebetween; and
    directing said second gas into said annular spacing.

11. The method as recited in claim 6, wherein said pipe further comprises a second wall outside said wall and spaced apart therefrom so as to define an annulus therebetween, said second wall having an interior, an exterior, a proximal end and a distal end, said second wall having a second interior and a second exterior, and wherein said second applying step further comprises directing said second gas into said annulus so that second gas is confined proximate to said exterior of said first wall.

12. The method as recited in claim 6, wherein said second gas is helium.

13. The method as recited in claim 6, wherein said purging gas is air and said second gas is helium.

14. Apparatus for detecting a leak in the wall of a pipe, said wall having an interior and an exterior, said apparatus comprising:

first means for applying a purging gas to said interior;

second means for directing a second gas along said exterior, said second gas being more active than said purging gas to that a portion of said second gas passes from said exterior to said interior through said leaks in said wall of said pipe;

means for detecting the presence of said portion of said second gas;

means for moving said detecting means through said interior of said pipe, said detecting means carried by said moving means; and means for determining the position of said detecting means in said interior of said pipe when said detecting means detects said portion of said second gas, said position of said detecting means being indicative of the location of said leaks in said wall of said pipe when said detecting means detects said portion of said second gas passing through said leaks in said wall.

15. The apparatus as recited in claim 14, wherein said first directing means directs said purging gas through said interior in a direction other than the direction said moving means moves said detecting means through said interior so that said first gas directs said second gas passing from said second side to said purging side through said leaks away from said detecting means once said detecting means has detected the presence of said second gas.

16. The apparatus as recited in claim 14, wherein said pipe has a proximal end and a distal end, wherein said moving means moves said detecting means through said interior from said proximal end to said distal end, and wherein said determining means further determines said position of said detecting means based on the distance said moving means has moved said detecting means from said proximal end.

17. The apparatus as recited in claim 14, wherein said pipe has a proximal end and a distal end, wherein said moving means moves said detecting means through said interior from said proximal end to said distal end, and wherein said determining means further determines said position of said detecting means based on the distance between said proximal end and said detecting means.

18. The apparatus as recited in claim 14, wherein said second gas is helium.

19. The apparatus as recited in claim 14, wherein said second gas is helium and wherein said detecting means is a probe responsive to the presence of helium.

20. The apparatus as recited in claim 14, wherein said second gas is helium, wherein said detecting means is a probe responsive to the presence of helium, wherein said moving means is a cord having a first end operably connected to said probe and a second end extending out of said interior at said proximal end, and wherein said probe enters said interior through said proximal end and then gradually moves from said proximal end to said distal end by gradually inserting said cord into said interior at said proximal end.

* * * * *